United States Patent [19]

Baker

[11] Patent Number: 4,574,340
[45] Date of Patent: Mar. 4, 1986

[54] INVERTER WITH CONSTANT VOLTAGE TO FREQUENCY RATIO OUTPUT CAPABILITY

[75] Inventor: Donal E. Baker, American Township, Allen County, Ohio

[73] Assignee: Westinghouse Electric Corp., Pittsburgh, Pa.

[21] Appl. No.: 623,582

[22] Filed: Jun. 22, 1984

[51] Int. Cl.⁴ .............................................. H02P 5/40
[52] U.S. Cl. ........................................ 363/41; 363/97
[58] Field of Search .................. 307/252 M; 318/801, 318/811, 723; 363/35, 37, 41, 96, 97, 98, 132, 133, 134

[56] References Cited

U.S. PATENT DOCUMENTS

| | | | |
|---|---|---|---|
| 3,412,316 | 11/1968 | Kernick | 363/133 |
| 3,715,648 | 2/1973 | Kernick et al. | 363/97 |
| 3,967,173 | 6/1976 | Stich | 318/227 |
| 4,259,620 | 3/1981 | Oates et al. | 318/802 |
| 4,342,076 | 7/1982 | Rosswurm et al. | 363/132 |
| 4,377,779 | 3/1983 | Plunkett | 363/41 |
| 4,409,534 | 10/1983 | Bose | 318/811 |

Primary Examiner—Patrick Salce
Assistant Examiner—D. L. Rebsch
Attorney, Agent, or Firm—R. P. Lenart

[57] ABSTRACT

A multiple phase electronic inverter circuit includes a transistor bridge output circuit having a pair of series connected transistors in each output phase leg connected between a pair of conductors for supplying direct current to opposite ends of the phase leg with a connection point between the transistors of each phase leg serving as an output power pole. A waveform pattern generator generates a transistor switching pattern which causes the transistors to alternate between two complementary operating modes such that one transistor in each phase leg functions in a communication mode and the other transistor in that phase leg functions in a non-commutation mode. By switching between the two operating modes, saturation of controlled current feedback transformers in the base drive circuit of each transistor is prevented.

5 Claims, 7 Drawing Figures

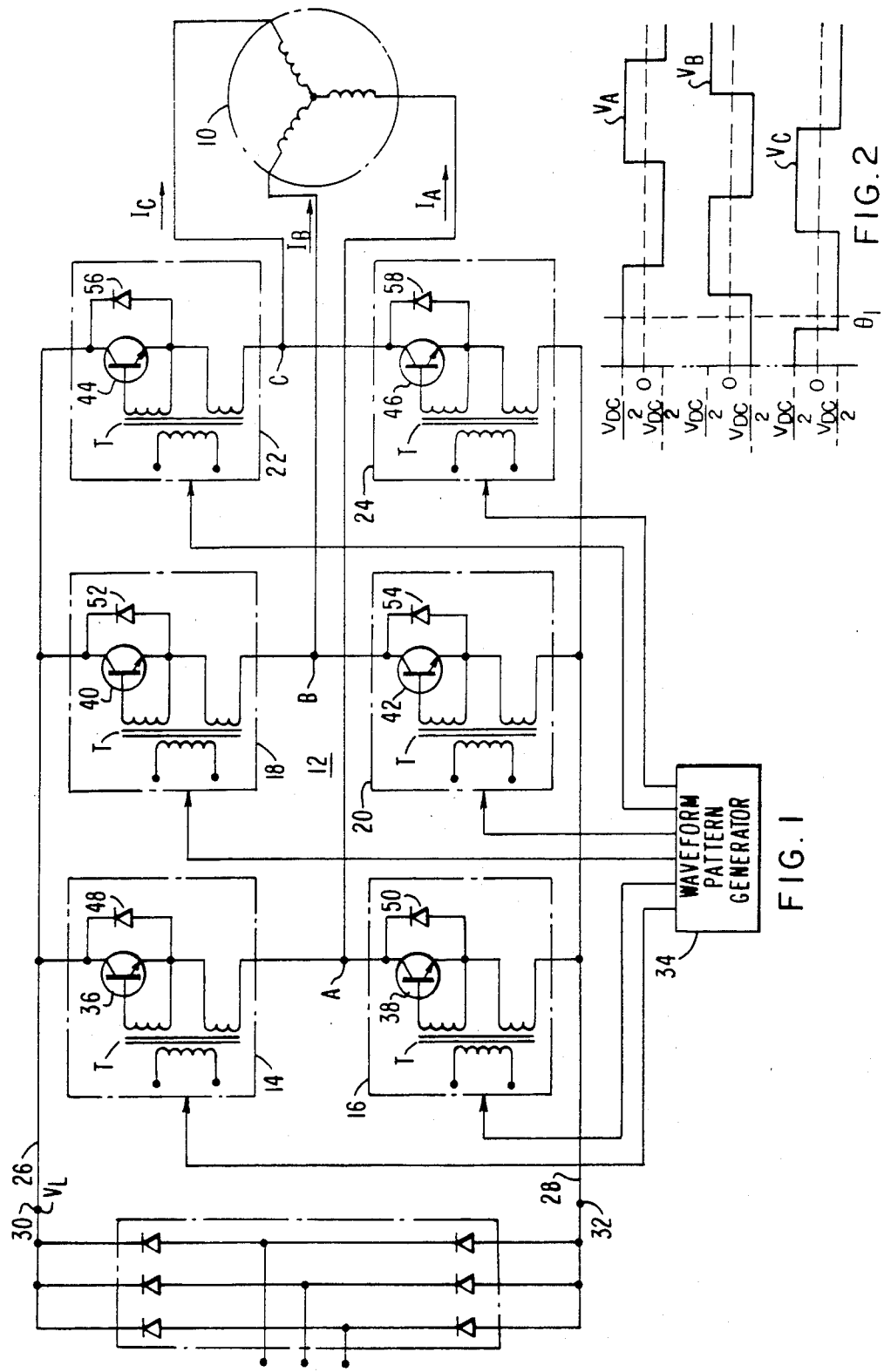

4,574,340

INVERTER WITH CONSTANT VOLTAGE TO FREQUENCY RATIO OUTPUT CAPABILITY

BACKGROUND OF THE INVENTION

This invention relates to electronic inverter circuits and more particularly to such circuits which are capable of supplying a constant voltage-to-frequency ratio output.

In airborne electrical power generation systems, it is desirable to have a single system which provides both the starter and generator functions. The weight savings on an airplane can be substantial when a dedicated starter is eliminated. For this reason, electrical power systems which are capable of providing engine start functions can provide both cost and weight savings.

Variable speed constant frequency (VSCF) power generation systems are commonly used for aircraft applications. One type of VSCF system includes a variable speed generator which supplies DC power to a pair of DC link conductors. An inverter circuit receives DC power from the link conductors and produces a constant frequency AC output. The inherent simplicity and reliability of DC link VSCF systems has been established and it is desired to modify the existing designs to provide starter capability.

DC link inverters commonly utilize a transistor bridge output circuit having a pair of series connected transistors in each output phase leg adapted to be connected between the DC link conductors, wherein a connection point between the transistors serves as an output power pole. The transistor drive circuits may include a controlled current feedback transformer (CCFT) which uses the transistor's collector current, through the CCFT turns ratio, to provide the required base drive in a self-supporting manner. The CCFT provides dielectric isolation between the power output transistors and the control circuits. It is necessary to keep the CCFT from saturating, otherwise loss of drive and loss of control of the inverter will result. U.S. Pat. No. 3,715,648, issued Feb. 6, 1973 to Kernick et al. discloses an inverter which utilizes a CCFT in the output transistor drive circuit and is hereby incorporated by reference.

One method of converting a DC link VSCF system to a starter/generator system is to use a contactor or set of contactors to turn the system around so that an external AC source supplies the inverter input voltage and the generator is connected to the inverter as a load. If the generator, acting as a motor in this case, is a synchronous machine, it will be necessary to provide AC current from the inverter at a frequency near zero hertz. Generally this has previously been considered impractical in inverters employing CCFT drive circuits since any frequency much below the normal rated frequency, for example 400 hertz, will result in saturation of the CCFTs in the transistor drive circuits.

SUMMARY OF THE INVENTION

This invention provides an inverter apparatus and method of operation which permits the use of existing CCFT drive circuit technology while preventing CCFT saturation at low output frequencies. A multiple phase electronic inverter constructed in accordance with one embodiment of the present invention comprises: a pair of DC link conductors; a plurality of output power pole terminals; an output circuit having a plurality of branch circuits connected in parallel between said DC link conductors, each of the branch circuits including a pair of switching transistors connected in series wherein each output power pole is connected to a point between the transistors in one of the branch circuits; a plurality of drive circuits for supplying base current to each of the transistors, each drive circuit including a controlled current feedback transformer which uses the collector current of the associated switching transistor to supply the required base drive current; and means for generating a switching pattern waveform for controlling the duty cycle of each of the switching transistors, said switching pattern alternating between a logic high level and a logic low level wherein each successive logic level lasts for a time which is less than the saturation time of the controlled current feedback transformer in each drive circuit while the period of the fundamental frequency of the inverter output voltage is greater than the saturation time of the controlled current feedback transformer in each drive circuit.

This inverter operates in accordance with the method of this invention wherein the switching pattern of the power pole transistors alternates between the two complementary operating modes in a manner which prevents saturation of the controlled current feedback transformers in the transistor drive circuits.

BRIEF DESCRIPTION OF THE DRAWINGS

FIG. 1 is a schematic diagram of a VSCF DC link inverter system wherein the generator has been reconnected as a motor;

FIG. 2 is a series of waveforms illustrating the output voltage of the inverter of FIG. 1;

DESCRIPTION OF THE PREFERRED EMBODIMENT

Figure 4:
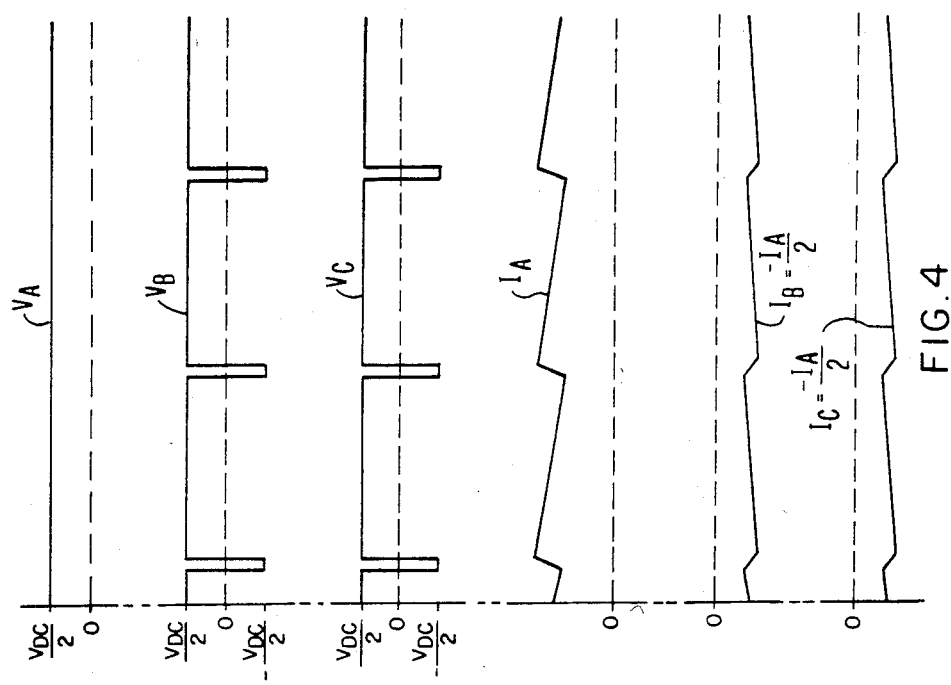
FIGS. 3 and 4 are a series of waveforms which illustrate the two complementary operating modes of the inverter of FIG. 1.

Referring to the drawings, FIG. 1 is a schematic diagram of a portion of a VSCF (variable speed constant frequency) inverter system wherein the generator 10 has been reconnected to operate as a motor. The inverter output circuit 12 includes a plurality of transistor switching circuits 14, 16, 18, 20, 22 and 24 having transistors which are arranged in series connected pairs between DC link conductors 26 and 28 such that power poles A, B and C are formed at the connection points between each transistor pair. A constant DC voltage is supplied to DC link conductors 26 and 28 by way of terminals 30 and 32, respectively, from an external power source. For example, in an aircraft application, the external power source may be an AC ground power cart connected to the rectifier portion of the VSCF system. Each switching transistor is driven by a drive circuit which includes a controlled current feedback transformer T in accordance with known drive technology. Waveform pattern generator 34 generates a switching pattern for switching the transistors. When operated in accordance with this pattern, alternating complementary transistor operating modes are produced, such that one transistor in each phase leg functions in a non-commutation manner when the switching pattern is in one operating mode and the other transistor in each phase leg functions in a non-commutation manner when the switching pattern is in the other operating mode. The switching transistors alternate between these operating modes in a manner which prevents saturation of any CCFT in the drive circuit of each transistor which is operating in a non-commutation mode.

In order to simplify the initial discussion of the operation of the circuit of FIG. 1, square wave output voltages are assumed. However, it should be understood that sine wave outputs could be assumed as well. FIG. 2 illustrates a series of square wave output voltages $V_A$, $V_B$ and $V_C$ wherein these voltages represent the output voltages appearing at power poles A, B and C in FIG. 1. $V_{DC}$ is the voltage between the DC link conductors. For purposes of explanation, it is assumed that the motor 10 is initially at zero rpm and at a shaft angle $\theta_1$ which requires the output of the inverter to be at a point indicated by the vertical dotted line in FIG. 2. This would correspond to a point in a sine wave system where phase A is at its maximum positive value and phases B and C are both at one-half of peak negative voltage. The machine is assumed to be synchronous and the rotor is locked; therefore, the inverter must put out the required current at zero frequency (DC).

Figure 3:
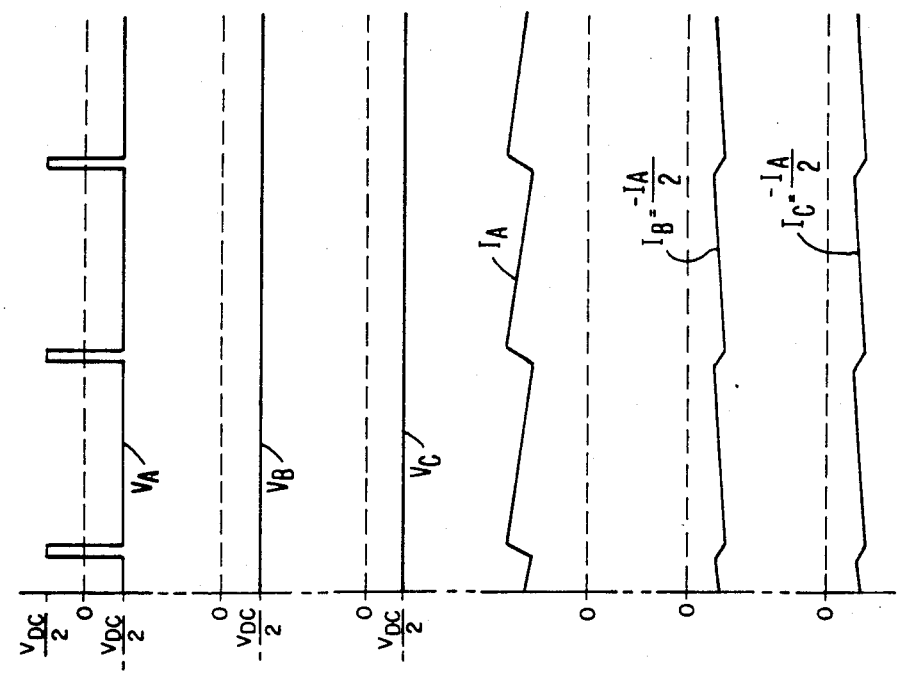

The waveforms of FIG. 3 illustrate how this output can be produced by maintaining the outputs $V_B$ and $V_C$ of poles B and C, respectively, continuously low while the output $V_A$ of pole A is pulsed high. The duty cycle of the pole A pulsing is sufficient only to provide the required motor current which is assumed in this example to be one per unit (p.u.) on pole A and $-0.5$ p.u. each on poles B and C. If the motor is assumed to have a typical resistance of 0.01 p.u. then the duty cycle will be 0.01 or 1%. Therefore, if it is assumed that the DC link voltage is at 1.0 p.u. then the transistor 36 in FIG. 1 will be on only 1% of the time and there is no danger of saturating its associated base driving CCFT. The base driving CCFT of transistor 38 will saturate since it is on 99% of the time, but this is inconsequential, since the current flows through commutating diode 50 and not in transistor 38 which is operating in a commutating manner. Hence, the saturation effects on the base drive circuits of transistors 36 and 38 of pole A are not detrimental. Poles B and C, however, carry their current through transistors 42 and 46, respectively and saturation of their associated base driving CCFTs will occur, causing loss of control of the inverter, unless steps are taken to prevent their saturation.

Since the inverter of a VSCF aircraft power generation system is normally designed to provide 400 hertz in the generating mode, the driving CCFTs will saturate when the condition of FIG. 3 is sustained for approximately one-half of a 400 hertz cycle or about 0.001 second. In order to prevent saturation, it is only necessary to change the inverter waveform pattern from that of FIG. 3 to that of FIG. 4. Here the switching pattern has been changed from a first mode, wherein the lower transistors of FIG. 1 are on, to a second mode wherein the upper transistors are on. This will allow the drive circuits of the lower transistors to begin to reset, that is, to drive the transformers away from saturation. If the transition to the upper transistors is done simultaneously on all three poles, then no disturbance on the motor voltage will occur during the transition period. This is illustrated by the fact that the output currents $I_A$, $I_B$ and $I_C$ are identical in the two operating modes illustrated by FIGS. 3 and 4. In order to maintain the desired motor currents after the transition, FIG. 4 illustrates that transistor 36 is turned on continuously and transistors 42 and 46 are pulsed on simultaneously. In this mode, transistors 40 and 44 are operating in a commutation manner so that current flows through their associated commutation diodes 52 and 56. Saturation in the base drive circuits of transistors 40 and 44 is therefore not critical. Current in pole A is, however, through transistor 36, and saturation of its driver will result and is critical. As this saturation point is reached, the poles are all reversed and the original operating mode is assumed, wherein the lower transistors are all on. Current is maintained by pulsing pole A as before. The pattern which controls the operation of the output transistors continues to cycle in this manner so that no drive circuit CCFT ever reaches saturation.

Figure 5:
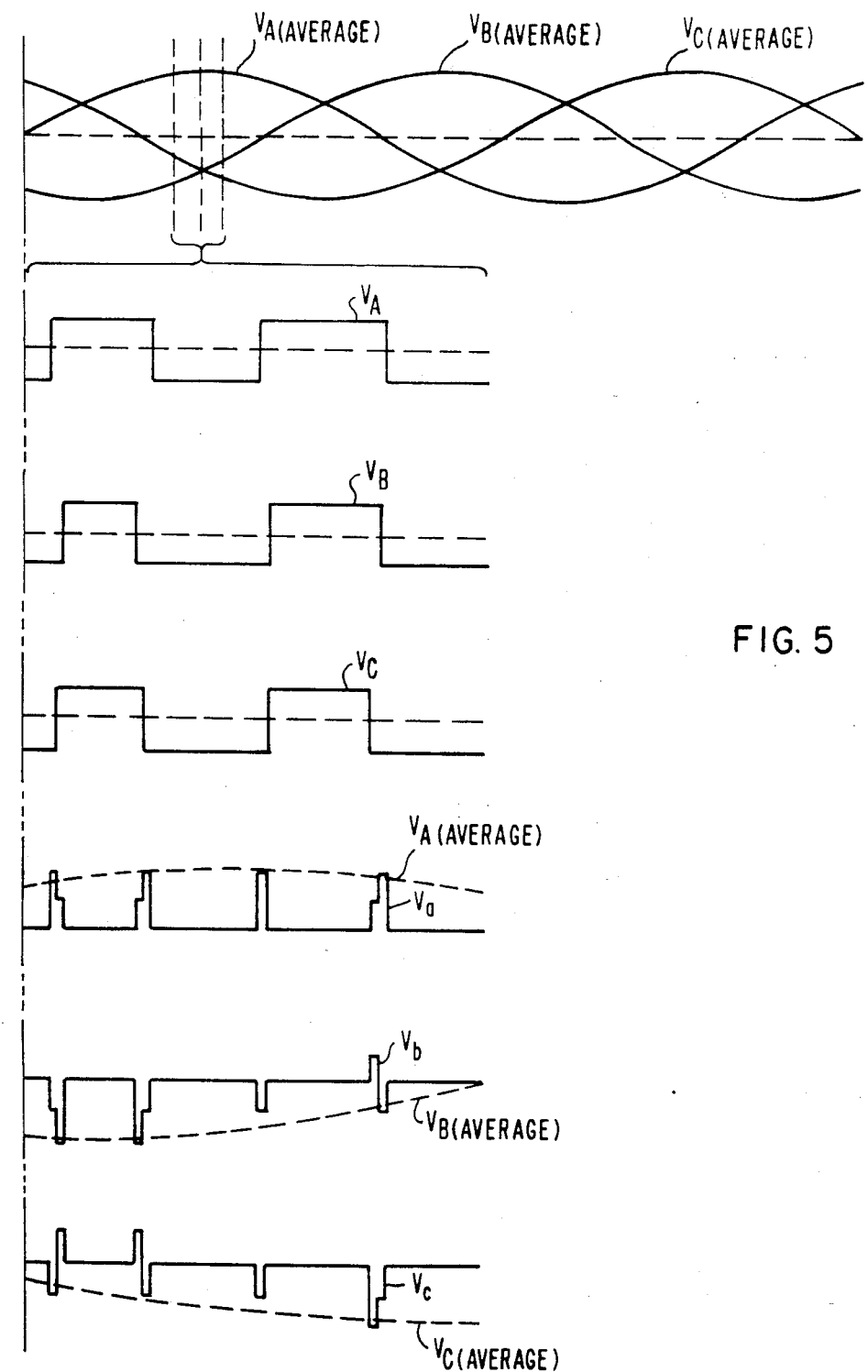
FIG. 5 is a series of waveforms which illustrate the method of producing a sine-wave current output from the inverter of FIG. 1.

Thus far, the present invention has been described by reference to simplied waveforms which illustrate the operating concept. It should be apparent, however, that if the motor speed and therefore the inverter output frequency, increases from zero, then the switching patterns will necessarily change. However, the principle of providing a waveform switching pattern which oscillates between two operating modes to prevent saturation of the transistor drive circuit CCFTs remains the same. FIG. 5 is a series of waveforms which illustrates that a sine wave current can be applied to the motor by providing suitable delays in each pole switching point. It should be apparent that a multiplicity of pattern and control techniques can be used to generate the required output currents as long as the switching waveform pattern oscillates between two complementary operating modes to prevent saturation of the drive circuit controlled current feedback transformers.

Figure 6:
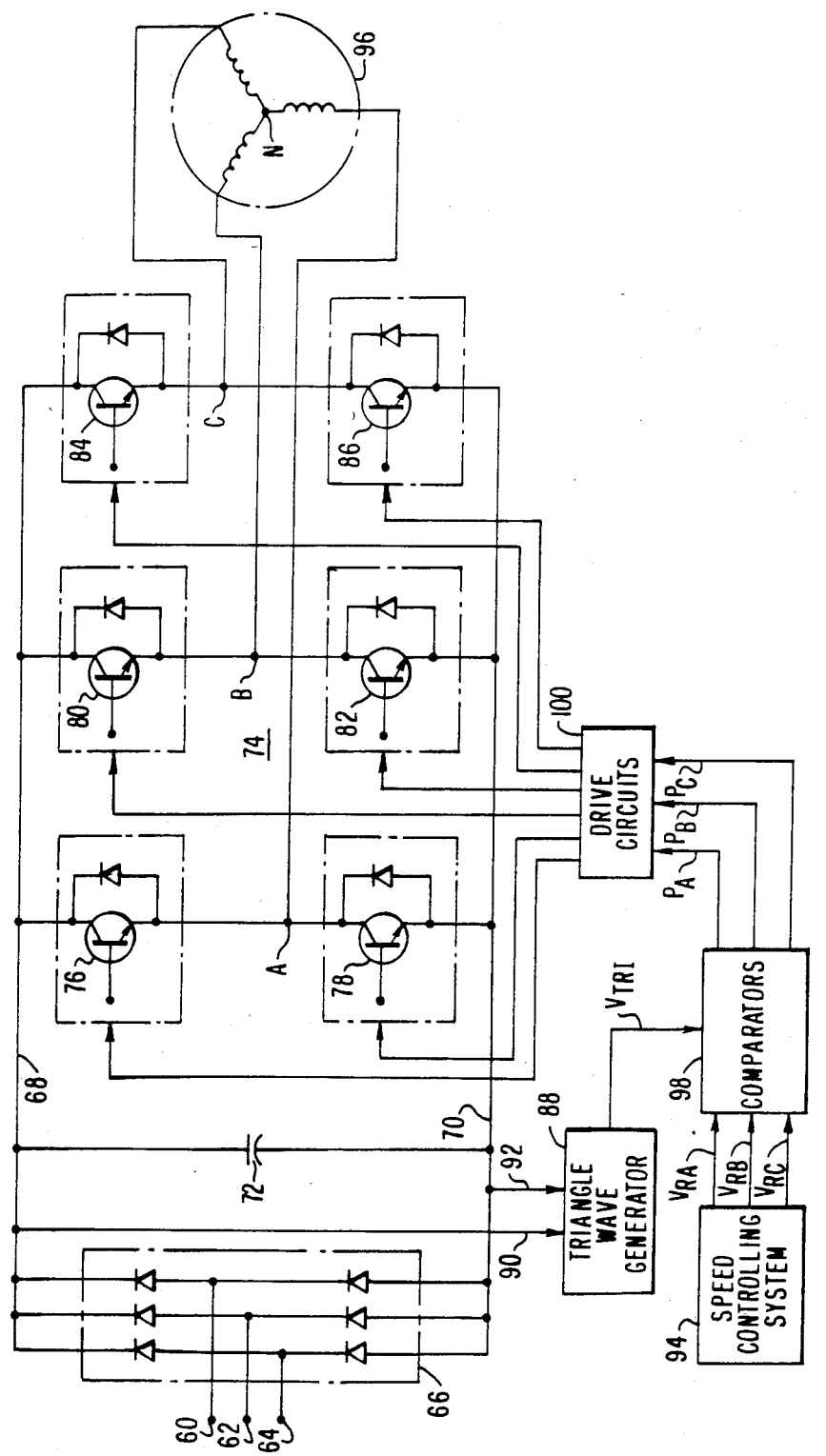
FIG. 6 is a schematic diagram of a DC link inverter constructed in accordance with one embodiment of this invention.

For example, FIG. 6 is a schematic diagram of a VSCF DC link inverter system that uses a sine-triangle crossover pattern generation scheme to control power pole switching in accordance with this invention. A constant AC voltage is supplied on terminals 60, 62 and 64 and rectified by diode bridge 66 to produce a DC voltage on DC link conductors 68 and 70. These DC link conductors are connected to a filter capacitor 72 and a plurality of transistor switching elements in a power pole switching circuit 74. The transistor switches are arranged in series connected pairs 76-78, 80-82, and 84-86, with each pair forming a circuit branch that is connected between DC link conductors 68 and 70. Power poles A, B and C are formed at the junction points between the transistors in each series connected pair.

A triangle wave generator 88 receives power from the DC link conductors by way of lines 90 and 92 and produces a carrier wave in the form of a triangular wave output $V_{TRI}$. A speed controlling system 94 generates a series of reference waves $V_{RA}$, $V_{RB}$ and $V_{RC}$ which are smooth sine wave functions representative of the desired output voltage amplitude and frequency of each output phase of the inverter. The inverter output is then used to drive motor 96. A series of comparators 98 are used to locate the crossover points between triangular waveform $V_{TRI}$ and the reference waves to generate binary data switching patterns $P_A$, $P_B$ and $P_C$ which are ultimately used to drive the inverter power poles high or low. The comparators are arranged so that when a reference wave exceeds the triangular wave, an associated power pole is forced high. When the reference wave is less than the triangular wave, the associated power pole is forced low.

Figure 7:
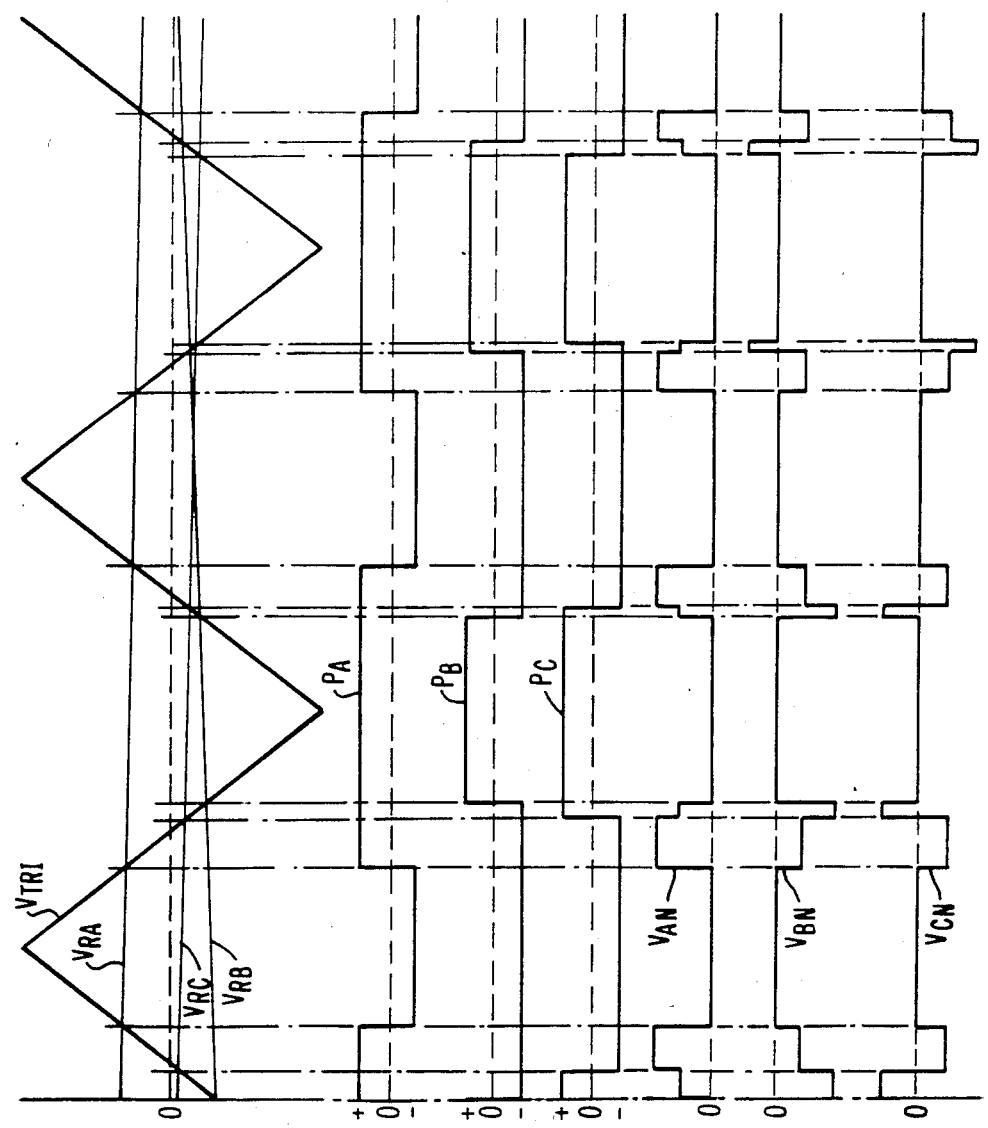
FIG. 7 is a series of waveforms which illustrate the operation of the circuit of FIG. 6.

The sine-triangular method used to generate the power pole switching patterns is illustrated by the waveforms of FIG. 7. Referring to these waveforms, binary switching pattern $P_A$ for power pole A can be seen to be in a logic high state when reference signal $V_{RA}$ exceeds the triangular waveform $V_{TRI}$. When $V_{RA}$ is less than $V_{TRI}$, switching pole pattern $P_A$ assumes a logic low level. The other switching pole patterns $P_B$ and $P_C$ are generated in the same manner. When these switching pole patterns are fed to the drive circuits 100 in FIG. 6, the pole to neutral voltages $V_{AN}$, $V_{BN}$ and $V_{CN}$ as shown on FIG. 7 are produced.

The triangular waveform frequency should be greater than or equal to 9 times the maximum inverter output frequency for distortion control purposes. In addition, the period of the triangular wave must be less than twice the saturation time of the control current feedback transformers in the driving circuits of the power pole switching transistors. The relative amplitude of the reference waves and the triangular wave are established such that a reference voltage which is equal to the triangular wave peak will cause full conduction of the associated power pole. Therefore, if the triangular wave amplitude is proportional to the DC link voltage, that is $V_{DC}/V_{TRI}$ equals K, then the ratio of average motor voltage to the reference voltage will be related to the constant K.

Using the link midpoint voltage as a reference point, the peak voltage attainable from the inverter bridge on any pole is $V_{DC}/2$. Hence for a motor voltage $V_M$ in the range of plus or minus $V_{DC}/2$, the average motor voltage $V_{M(Avg)}$ equals $K'*(V_R)$, where $K'$ equals $V_{DC}/(2 V_{TRI})$, and $V_R$ is the associated reference voltage waveform. The average motor voltage $V_{M(Avg)}$ is then fixed for all $V_{DC}$ input voltages. Therefore the sine-triangle method provides the function of a linear voltage amplifier with a gain equal to $K'$.

In the circuit of FIG. 6, the link voltage $V_{DC}$ is assumed to be fixed and the same triangular wave is used to generate the switching patterns for all three power poles. The resulting inverter output is then similar to that shown in FIGS. 3 and 4. That is, for very low frequencies, including DC, the power pole switching at the carrier frequency can prevent saturation of the driver transformers.

It should be understood that various other methods of generating the desired carrier based switching pattern are also within the scope of the present invention. In general, for magnetic loads such as a motor or transformer, a given design is made to accommodate a rated voltage and frequency. Lowering the frequency or increasing the voltage magnitude from this design point will result in magnetic saturation of the involved iron. The ensuing excessive currents will generally result in unacceptable performance or destruction of the device. Magnetic devices can be operated at lower frequencies if the applied voltage magnitude is also lowered in direct proportion. This gives rise to a constant voltage to frequency ratio requirement.

The control current feedback transformers used in driving the transistors of the inverters of this invention must also have a constant voltage to frequency ratio for lower frequency operation. However, their voltage magnitude is determined by the voltage drop of the base to emitter junction of the transistor that they are driving. The average voltage can only be reduced by reducing the duty factor of the applied voltage. This is acceptable in a system where the inverter is supplied with a fixed, or nearly fixed DC link voltage. In this case, the motor voltage is lowered by also lowering the duty factor of the inverter poles. The duty factor required to lower the applied motor voltage is the same as that required for the driver circuit transformers.

Although the present invention has been described in terms of what are at present believed to be its preferred embodiments, it will be apparent to those skilled in the art that various changes may be made without departing from the scope of the invention. It is therefore intended that the appended claims cover all such changes.

What is claimed is:

1. An electronic inverter comprising:
   a pair of DC link conductors;
   a plurality of output power pole terminals;
   an output circuit having a plurality of branch circuits connected in parallel between said DC link conductors, each of said branch circuits including a pair of switching transistors connected in series wherein each output power pole is connected to a point between the transistors in one of said branch circuits;
   a plurality of drive circuits for supplying base current to each of said transistors, each drive circuit including a controlled current feedback transformer which uses the collector current of the associated switching transistor to supply the required base drive current; and
   means for generating a switching pattern waveform for controlling the duty cycle of each of said switching transistors, said switching pattern alternating between a logic high level and a logic low level wherein each successive logic level lasts for a time which is less than the saturation time of the controlled current feedback transformer in each drive circuit while the period of the fundamental frequency of the inverter output voltage is greater than the saturation time of the controlled current feedback transformer in each drive circuit.

2. An electronic inverter as recited in claim 1, further comprising:
   a reference waveform generator for producing a reference wave, for each inverter power pole, having a period which is equal to the period of the fundamental frequency of a desired inverter output voltage; and
   a carrier waveform generator for producing a carrier waveform having a period which is less than the period of said reference wave and less than twice the saturation time of the controlled current feedback transformer;
   wherein said switching pattern for controlling the switching transistors connected to each power pole changes logic level when said carrier wave and the reference wave for the associated power pole cross.

3. An electronic inverter as recited in claim 2, wherein each of said reference waves is a sine wave and said carrier wave is a triangular wave having a peak to peak magnitude equal to the magnitude of a DC voltage between said DC link conductors.

4. An electronic inverter as recited in claim 1, wherein the power pole voltage resulting from switching said transistors in accordance with said switching pattern has a constant voltage to frequency ratio.

5. The method of operating a multiple phase electronic inverter having a transistor bridge output circuit with first and second series connected transistors in each output phase leg adapted to be connected between a pair of conductors for supplying direct current to opposite ends of each phase leg, wherein a connection point between the transistors of each phase leg serves as an output power pole, said method comprising the step of:

switching said bridge output circuit transistors in accordance with two alternating complementary operating modes, such that one of said operating modes causes said first transistor in each phase leg to function in a non-commutation mode and the other one of said operating modes causes said second transistor in each phase leg to function in a non-commutation mode, wherein the time during which any transistor operating in a non-commutation mode continuously remains in the non-commutation mode is less than the saturation time of a controlled current feedback transformer in each transistor base drive circuit; and wherein the power pole voltage resulting from switching said transistors in accordance with said switching pattern has a constant voltage to frequency ratio.

* * * * *